J. GILPATRIC.
Cultivator.
No. 62,405. Patented Feb 26, 1867.
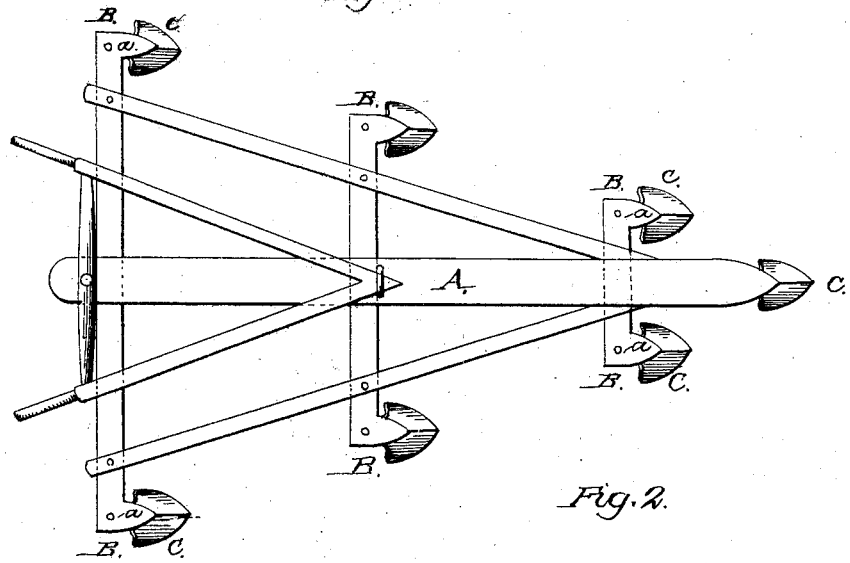
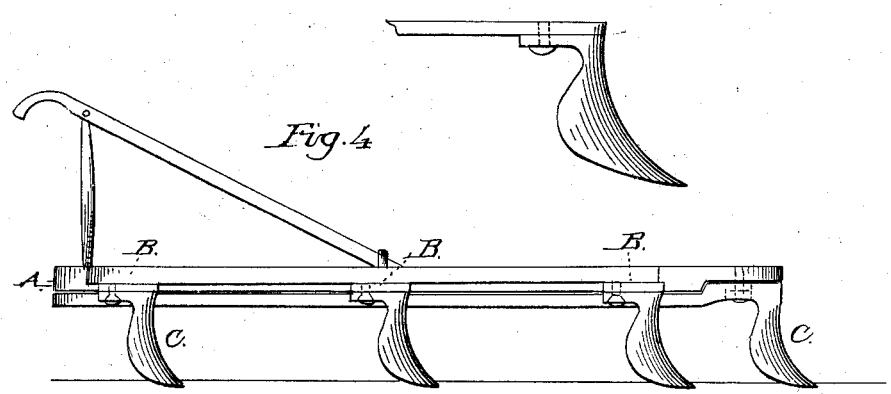
Witnesses:
Theo. Tusch
J. A. Service
Inventor:
John Gilpatrick
Per Munn & Co.
Attys

United States Patent Office.

JOHN GILPATRIC, OF BIDDEFORD, MAINE.

Letters Patent No. 62,405, dated February 26, 1867.

---

IMPROVEMENT IN CULTIVATORS.

---

The Schedule referred to in these Letters Patent and making part of the same.

---

TO ALL WHOM IT MAY CONCERN:

Be it known that I, JOHN GILPATRIC, of Biddeford, in the county of York, and State of Maine, have invented a new and useful Improvement in Cultivators; and I do hereby declare that the following is a full, clear, and exact description thereof, which will enable others skilled in the art to make and use the same, reference being had to the accompanying drawings, forming part of this specification, in which—

Figure 1 is a detached view of a cross-bar of my improved cultivator.

Figure 2 is a side view of the same with the tooth attached.

Figure 3 is a top view of a cultivator.

Figure 4 is a side view of the same.

Similar letters of reference indicate like parts.

This invention relates to an improvement in the construction of cultivators, the object of which is to prevent their clogging with weeds and grass. The value of this useful implement on a farm is much impaired by its liability to clog with grass and weeds, as generally constructed. In foul land it takes about one-half the driver's time to keep the teeth clear of grass and weeds, a difficulty which is obviated entirely by my improved mode of constructing the frame and the teeth. The ordinary mode of constructing cultivators is to attach the shanks of the teeth to the ends of the frame in such manner as to leave shoulders at the connection which catch the weeds and grass. By my improved mode of construction there is a continuous rise in the front edge of the teeth to the point of a projection on the ends of the cross-bars of the frame, so that there is no obstruction to the grass and weeds.

In a U-shaped cultivator, represented in the drawings, the middle bar A is made of wood, with a wrought-iron plate of proper size and strength on the under side. The cross-bars B B B are made wholly of iron, and their ends are turned forward so as to form lips or flanges, $a\ a$, running to a point, as shown in fig. 1. The teeth C C are made of cast iron, of usual shovel shape in the share or point, the shanks having flat heads, which fit underneath the tongues $a\ a$ of the cross-bars B B B and the point of the middle bar A, and are firmly secured to them by bolts, as shown in fig. 2. The front edges of the teeth are thus set forward by the tongues $a\ a$ in line with their points, so that the grass or weeds will rise to the top and pass over them without obstruction.

Having described my invention, I claim as new, and desire to secure by Letters Patent—

The iron cross-bars B, provided with tongues $a\ a$, and the cast-iron teeth C, when constructed and arranged as herein set forth and for the purpose specified.

JOHN GILPATRIC.

Witnesses:
BENJ. F. HAMILTON,
JOS. GILPATRIC.